Patented March 16, 1971
3,570,346
4 Sheets-Sheet 1
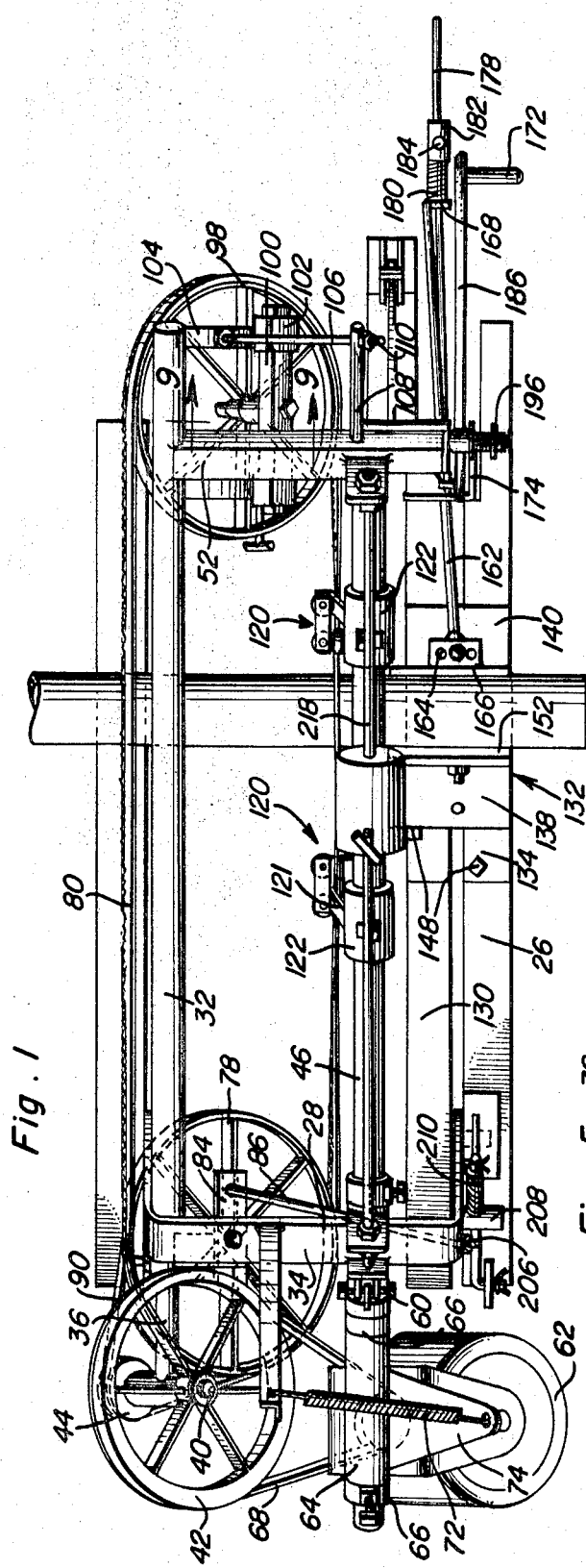
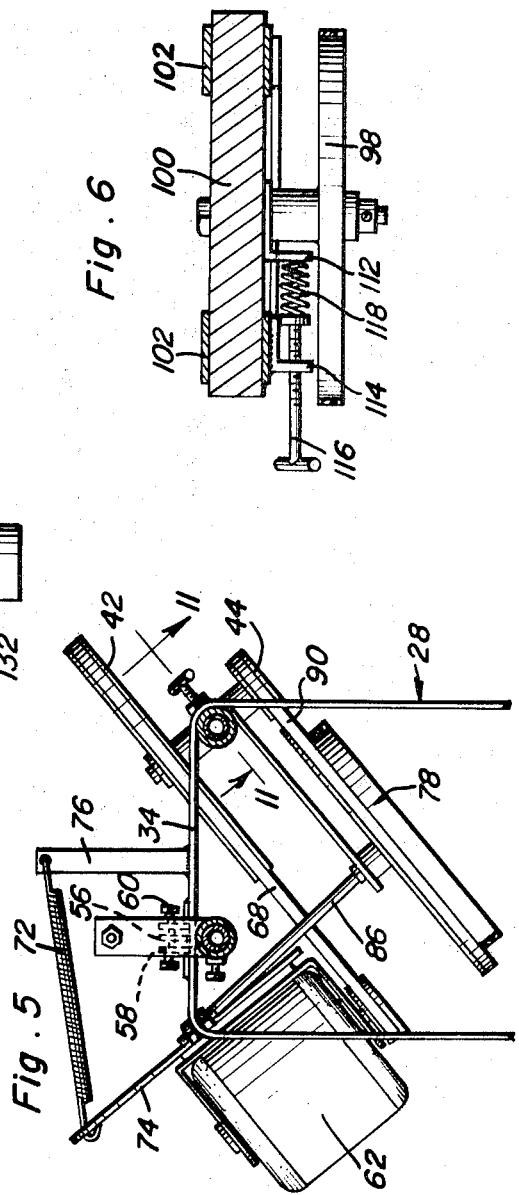
Walter J. Koinzan
INVENTOR.

United States Patent

[11] 3,570,346

| [72] | Inventor | Walter J. Koinzan<br>c/o Koinzan Seed & Flying Service Inc.,<br>Elgin, Nebr. 68636 |
| --- | --- | --- |
| [21] | Appl. No. | 803,329 |
| [22] | Filed | Feb. 28, 1969 |
| [45] | Patented | Mar. 16, 1971 |

[54] BAND SAW
18 Claims, 14 Drawing Figs.

[52] U.S. Cl. ................................................ 83/201.05,
83/389, 83/564, 83/589, 143/46
[51] Int. Cl. .................................................... B26d 1/46
[50] Field of Search ........................................ 83/201.04,
201.05, 201.06, 201.07, 385—389, 564, 589;
143/46

[56] References Cited
UNITED STATES PATENTS

| 380,857 | 4/1888 | Bryant | 83/201.05x |
| --- | --- | --- | --- |
| 764,717 | 7/1904 | Foshee | 83/201.05x |

*Primary Examiner*—James M. Meister
*Attorneys*—Clarence A. O'Brien and Harvey B. Jacobson ABSTRACT: A metal cutting band saw including a vertically pivoting endless blade tensioned and guided for selective raising and lowering relative to a workpiece clamping vise. A single control lever is provided for effecting the vertical movement of the blade or saw band with the frame mounting the blade selectively closing and opening a drive motor switch. The workpiece clamping vise is adjustable so as to clamp workpieces of different sizes therein and, when adjusted, automatically opens and closes in response to a vertical movement of the frame mounted saw blade. The saw blade guides are adjustably mounted and include bearing means whereby a true vertical orientation of the blade and an elimination of any tendency for the blade to roll is achievable. Guide means is provided on the free end of the blade frame for ensuring a true vertical movement thereof and adjustments cooperate with the opposed blade mounting wheels for a proper alignment thereof.

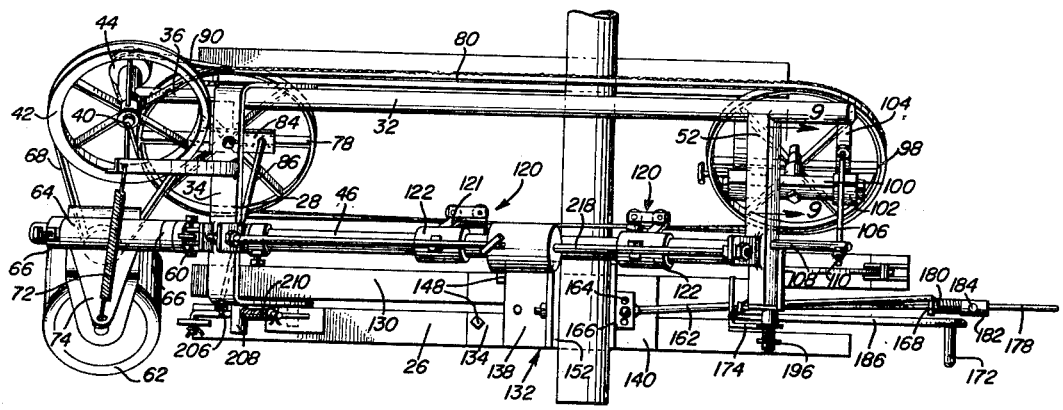

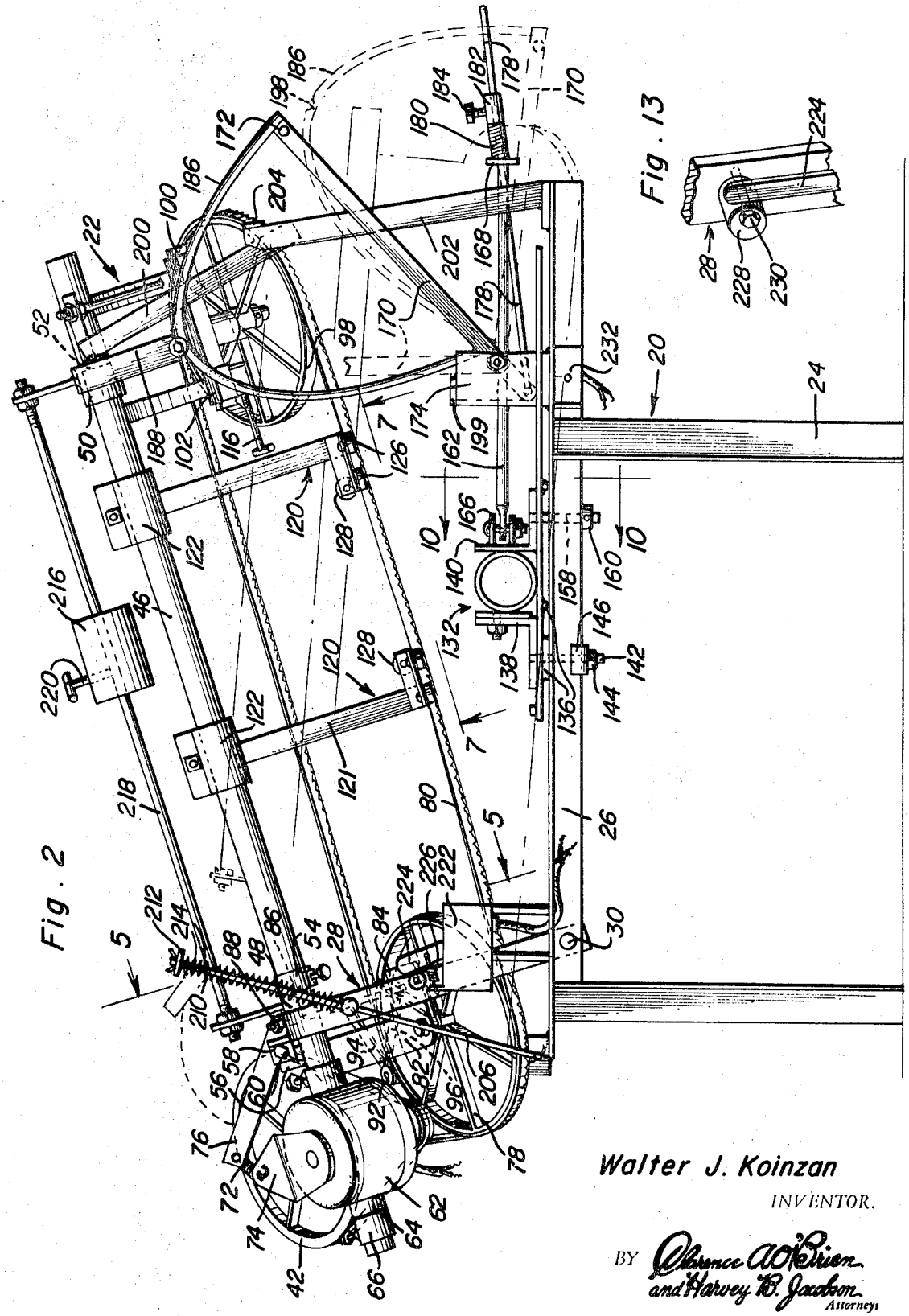

Patented March 16, 1971
3,570,346
4 Sheets-Sheet 3
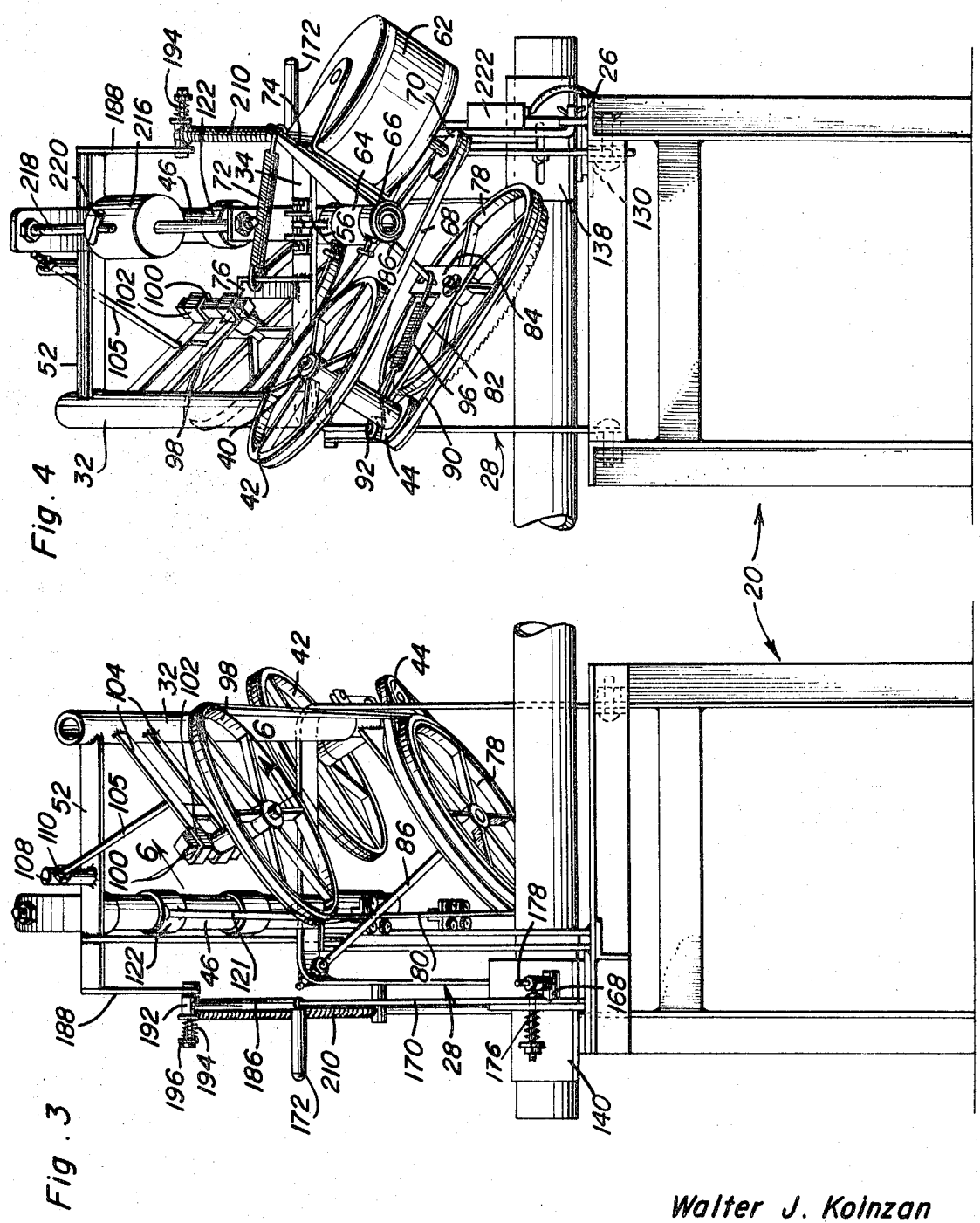
Walter J. Koinzan
INVENTOR.
BY Clarence A. O'Brien
and Harvey B. Jacobson
Attorneys

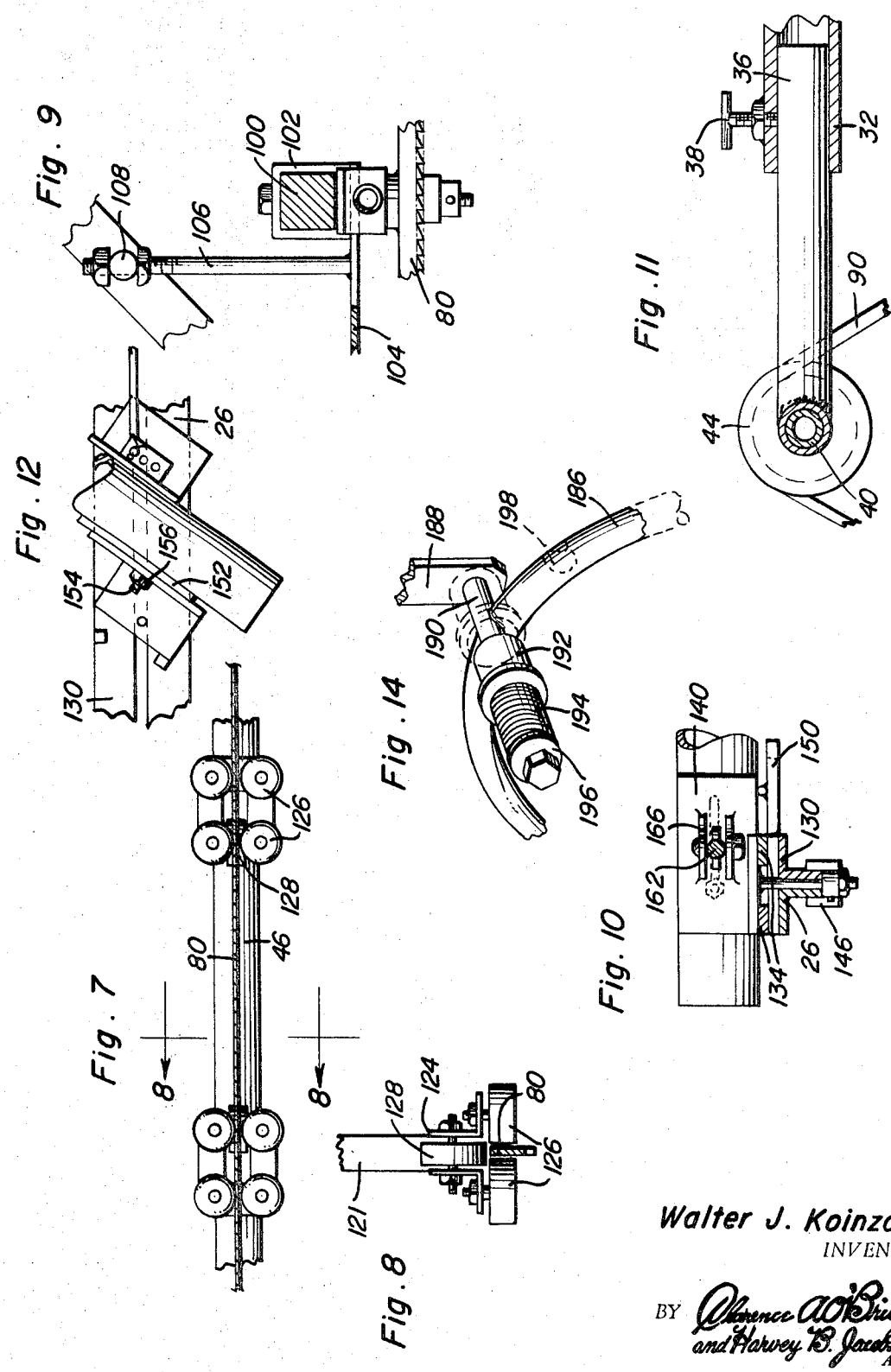

BAND SAW

The instant invention relates to bandsaws, and more particularly to a bandsaw wherein, once an initial setting is made so as to accommodate a particular size workpiece, a single lever can be utilized to control the automatic clamping and releasing of similar size workpieces, the manipulation of the saw blade so as to effect the desired cutting, and the starting and stopping of the cutting movement of the blade.

It is a primary object of the instant invention to provide a new and improved metal cutting bandsaw incorporating a control system whereby the clamping of the workpiece and the subsequent cutting operation is effected substantially automatically, requiring only the initial manipulation of a single control lever.

In conjunction with the above object, it is a significant object of the instant invention to provide a bandsaw wherein adjustments are incorporated into the apparatus so as to ensure a true vertical orientation of the cutting run of the endless band as well as a stable nonrolling of the band.

Likewise, it is considered significant to provide an improved bandsaw which, while relatively simple in construction and operation, is of a highly stable nature capable of trouble-free operation over extended periods of time, the bandsaw being particularly adapted, through the automatic vise provided thereon, for high speed production operations wherein a substantial amount of work can be cut in a minimum amount of time.

Basically, the objects of the instant invention are achieved through the provision of a base mounted vertically swinging frame upon which the driven saw blade travels. The raising and lowering of the blade frame is controlled by a single lever and, through appropriate linkages, automatically operates the workpiece vise so as to selectively clamp the workpiece during the cutting operation and release the workpiece upon a raising of the blade. Appropriate guide means are provided for properly orientating the blade. In addition, appropriate tension maintaining means are provided with the various blade driving elements, including the drive motor, the energization and deenergization of which is directly controlled by movement of the blade mounting frame. Also of significance is the fact that the basic control lever has structure associated therewith for selectively locking the blade frame in an elevated work disengaging position so as to enable a proper setting of the workpiece prior to the cutting operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of the apparatus of the instant invention;

FIG. 2 is a side elevational view of the apparatus with the right side of the machine constituting the front of the machine;

FIG. 3 is a front elevational view of the machine;

FIG. 4 is a rear elevational view of the machine;

FIG. 5 is a cross-sectional view taken substantially on a plane passing along line 5—5 in FIG. 2;

FIG. 6 is a cross-sectional detail taken substantially on a plane passing along line 6—6 in FIG. 3;

FIG. 7 is a sectional detail taken substantially on a plane passing along line 7—7 in FIG. 2;

FIG. 8 is a cross-sectional detail taken substantially on a plane passing along line 8—8 in FIG. 7;

FIG. 9 is a cross-sectional detail taken substantially on a plane passing along line 9—9 in FIG. 1;

FIG. 10 is a cross-sectional detail taken substantially on a plane passing along line 10—10 in FIG. 2;

FIG. 11 is a cross-sectional detail taken substantially on a plane passing along line 11—11 in FIG. 5;

FIG. 12 is a view illustrating a 45° orientation of the vise unit;

FIG. 13 is an elevational detail of the switch lever and eccentric cam control therefore; and FIG. 14 is a perspective detail of the notched portion of the control unit and the cooperating portion of the blade frame.

Referring now more specifically to the drawings, reference numeral 20 is used to generally designate a stationary base upon which the movable frame 22 of the bandsaw is mounted. This base 20 includes four vertical angle iron legs 24 interconnected at the upper ends thereof by appropriate angle iron support beams 26 orientated with the horizontal flanges thereof uppermost.

The blade mounting frame 22 includes a rigid U-shaped member 28 of a width so as to allow reception of the legs thereof between the near and far support beams 26 of the base 20. This U-shaped member 28 is inverted with the lower or free ends of the legs thereof being pivoted to the opposed near and far beams 26 by appropriate pivot means 30. A first elongated tube or tubular pipe 32 is welded to the member 28 in the corner defined between the far leg and the straight overlying bight portion 34. This tube 32 extends forwardly from the member 28 a distance generally corresponding to the length of the support base, and rearwardly therefrom a relatively short distance. Noting FIGS. 1, 4 and 11, a stub shaft 36 is telescopically received within the rear end portion of the tube 32 and is adjustably fixed therein by appropriate lock screw means 38 mounted on the end portion of the tube 32 for threaded adjustment into and out of engagement with the interiorly located shaft 36. The stub shaft 36 in turn mounts, on the outer end thereof, a transversely orientated rotatable shaft 40. The shaft 40, orientated at an angle to the vertical, mounts an enlarged pulley 42 on the upper end thereof and a small pulley 44 on the lower end thereof for rotation therewith.

A second elongated tube 46 parallels the tube 32 to the near side thereof, terminating short of the forward end of the tube 32 and extending beyond the rear end of the tube 32. The tube 46 is rotatably received through and supported by a sleeve 48 welded to the undersurface of the bight portion 34 of the member 28 in inwardly spaced relation to the corner defined between the near leg and the bight portion. In addition, the extreme forward end of the tube 46 is rotatably received within and supported by a tubular socket 50 welded to and projecting rearwardly from a laterally extending beam 52 welded to the forward portion of the tube 32. An appropriate collar 54, locked to the tube 46 immediately forward of the sleeve 48, acts so as to retain the tube 46 within the sleeve 48 and end socket 50.

It is contemplated that the tube 46 be rotatably adjustable within a limited range for reasons which will become apparent subsequently. In order to effect this adjustment, a rigid plate 56 is welded to the tube 46 just rearward of the U-shaped member 28 and projects vertically therefrom between a pair of laterally spaced rearwardly projecting platelike ears 58 welded to the bight portion 34 of the member 28 and projecting rearwardly therefrom. Each of these ears 58 includes an internally threaded bore laterally therethrough for the adjustable reception of a threaded adjusting bolt 60. These two bolts 60 engage the opposite sides of the tube mounted plate 56 and are manipulatable so as to vary the orientation of the plate 56 and hence the rotational orientation of the tube 46.

The drive motor 62 for the apparatus is positioned rearwardly of the adjusting unit 56—60 for the tube 46 and is rotatably mounted on the tube 46 by means of a tube encircling sleeve 64 retained against longitudinal movement on the tube 46 by appropriate lock collars 66. An endless drive belt 68 extends from and about the motor drive pulley 70 and the enlarged pulley 42 mounted on the jackshaft 40. Proper tension is maintained on the belt 68 by an appropriate tension spring 72 engaged between the motor mounting bracket 74, by which the motor is secured to the mounting sleeve 64 therefor, and a rigid bar 76 projecting upwardly from the bight portion 34 of the U-shaped member 28.

The drive wheel 78 for the saw blade 80 is mounted below, parallel, and slightly forward of the small jackshaft pulley 44 by means of a rigid platelike bar or bracket 82. This bracket 82 has the upper end thereof rigidly affixed, as by welding, to the rear end portion of the far tube 32 and includes appropriate journal means on the lower end thereof so as to rotatably support the wheel 78. This bracket 82 is additionally provided with a lateral extension 84 on the lower end thereof, the extension in turn having the lower end of a threaded rod 86 affixed thereto. The upper threaded end of this rod 86 is received through a hole in the near upper corner of the member 28 and is adjustably positioned therein by a pair of adjusting nuts 88 so as to both assist in the support of the blade drive wheel 78 and allow for slight adjustments therein so as to ensure a straight running of the blade. Proper tension is maintained on the endless belt 90, which engages about the pulley 44 and the blade mounting wheel 78, by a spring-loaded pivotally mounted idler roller 92. The arm 94 mounting the idler roller 92 is pivotally attached to the adjacent leg of the member 28, while the associated biasing spring 96 extends between the arm 94 adjacent the idler 92 and the bracket extension 84. Incidently, it will be appreciated that the blade drive wheel 78 includes two tracks thereabout, one for the belt 90 and the other for the blade 80 itself.

The forward end of the endless bandsaw blade 80 travels about an idler wheel 98. This wheel 98 is rotatably mounted on a square shaft 100 paralleling the tube 32 to the near side of the wheel 98. This square shaft 100 is slidably mounted within a pair of spaced square sleeves 102 which are in turn rigidly affixed, through extending bracket arms 104, to the forward end of the tube 32. A threaded rod 106 is fixed to the forwardmost one of the wheel supporting bracket arms 104 and extends upwardly therefrom through a hole in the outer end portion of a forwardly projecting rigid member 108 affixed to the transverse beam 52 which is in turn affixed to the tube 32. This threaded rod 106 is, through appropriate nut means 110, utilized to slightly adjust the idler wheel 98 whereby a proper tracking of the blade is ensured with regard thereto. It will of course be appreciated that the rod 106 also assists in stabilizing and supporting the idler wheel 98.

With reference particularly to FIG. 6, it will be noted that an adjustment means is provided for maintaining proper tension within the blade 80, such being effected by an adjustment of the longitudinal position of the idler wheel 98. This adjustment means includes a first plate 112 affixed to the wheel mounting shaft 100 and a second plate 114, having an internally threaded bore therethrough, paralleling the plate 112 inwardly thereof and being affixed to the inner square collar 102. An elongated threaded adjusting rod 116 is threaded through the plate 114 and, through a relatively stiff compression spring 118, engages against the first shaft mounted plate 112. In this manner, not only is an adjustment of the idler wheel 98 provided for, in a readily apparent manner, but at the same time a spring loading of the wheel 98 and hence the blade 80 results so as to ensure a proper maintaining of the desired blade tension.

In order to maintain the lower or cutting run of the blade 80 properly vertical so as to effect the desired cut upon a vertical swinging of the pivotally mounted blade supporting frame 22, a pair of guide units 120 are provided. Each guide unit 120 includes an elongated flat bar 121 rigidly affixed to and depending from a split sleeve 122 slidably received on the near tube 46 for selective clamping thereto at adjusted positions therealong. The lower end of each bar 121, noting the detailed views of FIGS. 7 and 8 in conjunction with FIG. 2, mounts, through a pair of angle brackets 124, four horizontal rollers 126, two engaging with each side of the blade 80 at two spaced points therealong, and one vertical roller 128 which engages against the back or smooth upper edge of the blade 80. In this manner, it will be appreciated that a high degree of stability is provide whereby any tendency for the blade to roll or misalign is completely eliminated.

The near base support beam 26 consists of an angle iron and is paralleled, immediately to the rear thereof, by a second angle iron beam 130. These two beams 26 and 130 have the vertical flanges thereof in facing relation to each other and slightly spaced so as to both accommodate the near leg of the frame mounting member 28 and the various mounting members of the workpiece clamping vise unit 132 as shall be described presently. The vise unit 132 includes a pair of parallel laterally spaced flat plates 134 overlying the adjacent beams 26 and 130 and maintained in spaced relation thereabove by appropriate spacer plates and rods 136. The lateral spacing between the plates 134 aligns with the space between the two underlying beams. A fixed jaw 138 and a movable jaw 140 are provided in facing relation to each other on the plates 134, the movable jaw 140 being located forwardly of the stationary jaw 138 along the length of the apparatus. Both jaws are formed of angle irons, including work clamping vertical flanges and horizontal mounting flanges. The mounting of the stationary jaw 138 includes a rigid rod 142 affixed to the horizontal flange thereof and extending through the space defined between both the two plates 134 and the underlying two beams. The lower end of this bolt 142 is externally threaded and receives a locking nut 144 which in turn upwardly moves a bolt mounted U-shaped clamp 146 about the lower edge portions of the vertical flanges of the two beams 26 and 130 so as to fix the position of the stationary jaw 138. It will of course be appreciated that this jaw 138, while stationary during the normal operation of the machine, can in fact be adjusted angularly, as suggested in FIG. 12, and even longitudinally should such become necessary. In comparing the position of the stationary jaw 138 in FIGS. 1 and 12, it will be noted that a pair of stops 148 are mounted on the plates 134 so as to cooperate therewith in stabilizing the stationary jaw 138 selectively in one position so as to achieve a 45° angle cut on the workpiece and another position so as to achieve a 90° cut on the workpiece.

In order to provide additional support for the workpiece, a support ledge 150 is provided in inwardly projecting relation to the inner beam 130 in general alignment between the vise jaws 138 and 140. In addition, it is contemplated that an adjustable extension plate 152 be provided on the face of the stationary jaw 138, this extension plate 152 being adjustably mounted by means of a bolt 154 projecting rearwardly therefrom and received through an elongated slot defined in the upstanding flange of the jaw 138. An appropriate nut 156 is provided for clamping the extension plate 152 to the jaw flange once the extension plate 152 has been moved to its adjusted position.

The movable jaw 140 is mounted by means of an elongated rod 158 affixed to the lower flange thereof and projecting vertically downward through the spaced plates and beams, the lower end of the rod 158 having a retaining collar 160 mounted thereon. The collar 160 is so located as to retain the vise jaw 140 in its proper vertical orientation, while still allowing for a sliding and rotating thereof in a manner and for reasons which shall be described presently.

An elongated horizontally orientated rod 162 is pivotally pinned to any one of three pairs of holes 164 provided between a pair of vertically spaced mounting ears 166 welded to and projecting forwardly from the vertical flange of the movable jaw 140. This rod 162 projects forwardly in spaced relation above the supporting base and terminates in a laterally directed apertured lip 168.

An elongated control lever 170, including a lateral handle 172 on the outer end thereof, has the end portion thereof opposite from the handle 172 pivotally fixed to a vertical frame member 174 by spring-loaded pivot pin means 176 for swinging movement in a vertical plane. This pivotally secured inner end of the lever 170 is located forwardly of the vise unit 132 and adjacent the rod 162 which is received through a guide hole in the lever mounting frame member 174. The lever 170 has the extreme inner end thereof positioned inward the point of pivotal engagement with the structural member 174 and pivotally mounts one end of a forwardly extending small diameter rod 178. The forward end portion of the rod 178 passes through the hole in the lip 168 of the rod 162, after which a compression spring 180 is slid on the outer end of the rod 178 into engagement with the lip 168 where it is retained by an adjustable sleeve 182 having a lock screw 184 associated therewith. The control lever construction is completed by an upwardly arcing rod 186, the opposite ends of which are fixed to the control lever 170 at the extreme forward end thereof and at a point immediately forward of the pivot means 176.

The pivoting frame 22 which mounts the blade 80 and the drive apparatus therefor includes a depending plate or structural member 188 affixed to the outer end of the beam 52 mounted on the forward end of the tube 32. This plate 188, noting FIG. 14 in particular, mounts an elongated laterally projecting shaft 190 which in turn rotatably receives an enlarged roller 192. This roller 192 is normally spring-biased, by a shaft mounted compression spring 194, inwardly on the shaft 190 and against the mounting plate 188, the spring 194 being retained between the roller 192 and the outer end of the shaft 190 by an appropriate bolt mounted washer 196. The roller 192, in its inwardly biased position, is so orientated relative to the curved rod 186 as to track or roll thereon in response to a raising or lowering of the control lever 170, thereby resulting in a corresponding upward or downward swinging of the free end of the frame 22.

Specific provision is made to hold the frame 22 in an elevated position, such consisting of a notch 198 defined in the periphery of the curved rod 186 at a point so as to align with the roller shaft 190 upon a movement of the frame 22 to the desired elevated position. This notch 198 is of a size to snugly and fixedly receive the roller shaft 190 therein and in effect lock the frame in an elevated position while also locking the control lever 170 due to the spaced axes of rotation provided for the frame and lever. The notch 108, while of a size to lock with the roller shaft 190, will allow the roller 192 to roll freely thereover. Thus, in order to effect the desired holding of the frame 22 in its upwardly swung or open position, it is necessary to manually retract the roller 192 against the biasing force of the spring 194 as illustrated in FIG. 14. A release of the frame 22 can be effected by slightly elevating the frame 22 relative to the notched rod 186 to allow the roller 192 to snap back into its tracking position. It will be appreciated that upon a raising of the control lever 170, and hence an elevating of the blade frame 22, the lever mounted rod 178 is moved forwardly out of spring-loaded biasing engagement with the movable jaw mounted rod 162, hence releasing the clamped workpiece for replacement thereof. Should it be desired to elevate the frame 22 further, the lever 170 can be swung vertically against a stop 199 on the frame member 174 with the roller 192 or shaft 190 sitting on the upper end thereof.

In order to stabilize and guide the swinging forward end of the blade mounting frame 22, an elongated flat guide bar 200 is welded to the beam 52 and projects downwardly and forwardly therefrom at an angle for reception between a pair of spaced vertical bars 202 fixed to the support base, at the extreme forward end thereof, and projecting vertically therefrom. Thus, the two base mounted guide bars 202 closely receive and vertically guide the frame mounted guide bar 200 during the vertical swinging of the frame 22. If so desired, the length of the guide bar 200 can be such so as to engage against the support base between the base mounted guide bars 202 in the lowermost position of the frame 22 so as to constitute a stop therefor. Alternatively, appropriate stops can be mounted on the base for engagement by the frame mounting member 28. By the same token, a cross plate 204, extending between the upper ends of the base guide bars 202 can be so orientated as to engage against the frame guide bar 200 in the uppermost desired position of the frame 22 so as to constitute a limit therefor.

The blade mounting frame 22 is to be spring-balanced, this being effected by the provision of an elongated rod 206 pivotally attached, at one end thereof, to the rear of the supporting base 20 rearward and to the near side of the U-shaped frame mounting member 28. This rod projects upwardly through a short shaft 208 rotatably mounted on and projecting laterally from the near leg of the member 28. The rod 206 mounts, between the shaft 208 and the extreme upper end thereof, an elongated compression spring 210 which is retained, at the upper end thereof, by a pin located washer 212. Thus, a downward swinging of the frame 22 from the position illustrated in FIG. 2 is resiliently resisted by the spring 210. In order to provide for an adjustment of the biasing force of the spring, the upper portion of the rod 206 can in fact be provided with a series of holes 214 therethrough so as to accommodate the pin which mounts the washer 212.

In addition to the counterbalancing spring unit, a counterweight 216 is slidably mounted on an elongated rod 218 which in turn is mounted on the pivoting frame 22 so as to extend along a substantial portion of the length thereof. This weight 216, as will be appreciated from the drawings, is provided with an appropriate lock screw member 220 for a fixing thereof in a selected position along the length of the rod 218.

It is contemplated that the stopping and starting of the saw be effected automatically in response to position of the saw mounting frame 22. In order to effect this, an appropriate switchbox 222 is mounted on the base adjacent the frame mounting member 28. The switchbox 222 includes an elongated pivotally mounted switch actuating member 224 projecting upwardly therefrom and spring-biased, by spring means 226, rearwardly into a switch-on position. The near leg of the frame member 28 has an eccentric cam member 228 mounted thereon and projecting laterally therefrom for engagement with the switch lever 224. This mounting of the cam 228 is effected by means of a threaded bolt 230 which can be loosened so as to enable a rotational adjustment of the eccentric cam 228 so as to vary the point at which the switch is thrown and the motor deenergized. In other words, as the frame 22 pivots downwardly, the frame member 28 swings forwardly, moving the cam-engaged switch lever 224 forwardly therewith with it being the intention of this automatic control to stop the cutting action of the saw immediately subsequent to a passing of the blade through the vise held workpiece. An appropriate master control switch 232 adjacent the frame controlling lever 170 will also of course be provided.

In order to set up the bandsaw for use, the movable jaw 140 is pulled away from the fixed jaw a sufficient distance so as to allow the workpiece to fit between the jaws. The control handle 170 is raised until the notch 198 in the curved rod 186 aligns with the roller shaft 190, at which point, the roller shaft 190 is seated within the notch 198 so as to fix the blade mounting frame 22 in an elevated position. The movable jaw 140 is then pushed against the workpiece and the locking sleeve 182, mounted on the control lever mounted rod 178, is moved tightly against the spring 180 which in turn seats against the laterally directed lip 168 on the movable jaw controlling rod 162. The sleeve 182 is then locked to the rod 178. Thus, as the control lever 170 is lowered, resulting in a corresponding lowering of the blade mounting frame 22, the movable jaw 140 is forced against the workpiece and effects an automatic and positive clamping of the workpiece between the movable jaw 140 and the stationary jaw 138. It will of course be appreciated that this movement of the movable jaw is effected by the swinging control lever 170 pulling the rod 178 which in turn transmits this pulling force to the jaw mounted rod 162. By the same token, as the control lever 170 is raised, elevating the saw blade away from the workpiece, the movable jaw will release, allowing an adjustment or replacement of the workpiece. In this manner, it will be appreciated that once the vise unit is setup so as to accommodate a particular size workpiece, similar workpieces can be quickly positioned and clamped without requiring any additional adjustment of the vise unit, the clamping of the workpiece being effected automatically in response to a lowering of the control handle 170.

From the foregoing, it will be appreciated that a unique bandsaw has been defined, this bandsaw incorporating several significant and unique features which contribute to the formation of a highly efficient unit. For example, the control lever, in conjunction with the upwardly arcing rod secured thereto, effects, upon a manipulation thereof, the raising of the saw frame, the opening of the vise unit so as to allow for a repositioning of the workpiece, and a turning on of the motor. Subsequent to a repositioning of the workpiece in the vise unit, or the introduction of another workpiece thereinto, the saw frame is gently lowered with the control lever until the saw blade starts cutting, after which the lever is moved completely down, until it engages the base structure, and the saw blade is allowed to automatically travel through the workpiece, after which the motor switch is thrown and the blade halted. In addition, the arcuate rod, through the notch provided therein, can also be utilized to lock the blade frame in an elevated position for a resetting of the vise unit or the making of any other adjustments required.

Further significant features of the instant invention reside in the mounting of the blade guides on the rotatable overhead tube which can, through the adjustment means provided in conjunction thereon, be rotated to a limited degree so as to adjust the setting of the blade, the guide arms including, in each instance, four rollers which provide for a substantial engagement with the blade and hence an elimination of any tendency for the blade to roll or become misaligned. The blade itself can also be adjusted through the provision of the specific adjustment means engaged with the blade drive wheel and blade idler wheel. Finally, the guide provided on the swinging end of the blade frame is considered significant so as to ensure a positive straight up-and-down movement of the blade as well as a stop defining the lower limit of movement of the blade, the actual movement of the blade being regulatable by both the spring-loaded counterbalance and the adjustable counterweight.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. In a bandsaw, a supporting base, a blade mounting frame pivotally secured at one end thereof to said base for pivotal movement in a generally vertical plane relative to the base, an endless bandsaw blade mounted on said frame for travel thereabout, the second end of said frame swinging toward and away from said base upon a pivotal movement of the frame, movable control means mounted on said base below the second end of the frame, cooperating means on said frame adjacent the second end thereof and in alignment with said control means for engagement by said control means, said control means being selectively engageable with said cooperating means on the frame upon a raising of the control means for a selective raising of the frame, said control means selectively locking to said frame mounted cooperating means upon a raising of the frame to a predetermined height so as to maintain the frame elevated.

2. The bandsaw of claim 1 including a workpiece gripping vise unit mounted on said supporting base, and vise actuating means engaged between the vise unit and the control means for enabling a clamping of the vise unit on a received workpiece in response to a lowering of said frame, and a release of said vise unit upon a raising of said frame.

3. The bandsaw of claim 2 including a drive motor for the blade, switch means for said motor mounted on said base, and switch controlling means mounted on said mounted frame and orientated so as to selectively engage and operate said base mounted switch means in response to a pivotal movement of said frame, said switch means, through an engagement of the switch control means thereagainst, deenergizing the blade motor upon a movement of the frame to a lowered position wherein a completion of the desired cut is effected, said switch means switching on said motor upon an elevation of said frame and a corresponding movement of the switch control means relative to the switch means.

4. The bandsaw of claim 3 wherein said blade comprises an endless band defining upper and lower runs, the lower run of said band effecting the cutting of the workpiece, an elongated structural member spanning said frame in overlying relation to the lower run of the blade in parallel relation thereto, said member being rotatably mounted for rotation about the central axis thereof within a predetermined range, and blade guide means engaged with said member and depending therefrom into guiding engagement with the lower run of the blade, said guide means being longitudinally adjustable along said member.

5. The bandsaw of claim 4 wherein said guide means comprise a pair of separate spaced guides, each extending from the rotatably mounted member to the lower run of the blade, each of said guides having, on the blade engaging lower end thereof, two spaced pairs of rotatably mounted wheels, the two wheels of each pair of wheels engaging the opposite sides of the blade at directly opposed points.

6. The bandsaw of claim 5 wherein each guide includes a vertically orientated fifth wheel engageable against the upper noncutting edge of the lower run of the blade.

7. The bandsaw of claim 4 wherein said blade is engaged about a drive wheel at one end of said frame and an idler wheel about the second end of said frame, bracket means mounting said wheels on said frame, and adjustment means engaged between each wheel mounting bracket means and the frame for adjusting the orientation thereof and correspondingly the orientation of the blade for a proper positioning thereof.

8. The bandsaw of claim 7 including an elongated rigid bar guide mounted on the second end of said frame and depending therefrom, and vertically elongated guide receiving means mounted on said base in general alignment with the bar guide for the guided reception thereof as the blade mounting frame swings vertically so as to effect a guiding of the second end of said frame.

9. The bandsaw of claim 8 including means for varying the effective weight of the frame comprising weight means mounted on said frame for longitudinal adjustment therealong, and counterbalancing spring means engaged between said frame and the supporting base.

10. The bandsaw of claim 9 wherein said control means includes a vertically orientated arcuate member vertically swingable as a part of the control means, said cooperating means including an outwardly projecting shaft overlying said arcuate member and a spring-loaded roller on said shaft selectively movable from a first position engaging the arcuate member for rolling movement therealong and a second position exposing the shaft for engagement with the arcuate member, said arcuate member, upon a raising thereof, engaging the roller for effecting an elevation of the blade mounting frame as the roller travels along the arcuate member.

11. The bandsaw of claim 10 wherein the selective locking of the control means to the cooperating means is effected by a notch within said arcuate member which is selectively alignable with the roller shaft upon an elevation of the frame to a predetermined point, said shaft, when received in said notch, locking therein until specifically released therefrom through an elevation of the frame relative to the arcuate member.

12. The bandsaw of claim 11 wherein said control means also includes an elongated lever pivotally mounted to the base, said vise unit including a stationary jaw and a movable jaw, said means engaged between the vise unit and the control means comprising an elongated rod pivotally engaged with the movable jaw and extending therefrom beyond the pivotally mounted portion of the control means lever, a second rod engaged between said control lever and the outer end of the jaw mounted rod in a manner whereby a lowering of the control means lever effects a forward drawing of the second rod into operative engagement with the jaw mounted rod for a movement of the jaw mounted rod, and hence the movable jaw, toward the stationary jaw, said lever being secured to said arcuate member for the simultaneous operation thereof.

13. The bandsaw of claim 12 wherein the frame mounted switch control means comprises an eccentrically mounted cam adjustable so as to vary the operational engagement with the switch means and hence the points at which the motor is energized and deenergized.

14. The bandsaw of claim 2 wherein said control means includes an elongated lever pivotally mounted to the base, said vise unit including a stationary jaw and a movable jaw, said means engaged between the vise unit and the control means comprising an elongated rod pivotally engaged with the movable jaw and extending therefrom beyond the pivotally mounted portion of the control means lever, a second rod engaged between said control lever and the outer end of the jaw mounted rod in a manner whereby a lowering of the control means lever effects a forward drawing of the second rod into operative engagement with the jaw mounted rod for a movement of the jaw mounted rod, and hence the movable jaw, toward the stationary jaw.

15. The bandsaw of claim 1 wherein said blade is engaged about a drive wheel at one end of said frame and an idler wheel about the second end of said frame, bracket means mounting said wheels on said frame, and adjustment means engaged between each wheel mounting bracket means and the frame for adjusting the orientation thereof and correspondingly the orientation of the blade for a proper positioning thereof.

16. The bandsaw of claim 1 including an elongated rigid bar guide mounted on the second end of said frame and depending therefrom, and vertically elongated guide receiving means mounted on said base in general alignment with the bar guide for the guided reception thereof as the blade mounting frame swings vertically so as to effect a guiding of the second end of said frame.

17. The bandsaw of claim 1 wherein said control means includes a vertically oriengaged arcuate member vertically swingable as a part of the control means, said cooperating means including an outwardly projecting shaft overlying said arcuate member and a spring-loaded roller on said shaft selectively movable from a first position engaging the arcuate member for rolling movement therealong and a second position exposing the shaft for engagement with the arcuate member, said arcuate member, upon a raising thereof, engaging the roller for effecting an elevation of the blade mounting frame as the roller travels along the arcuate member.

18. The bandsaw of claim 1 including a drive motor for the blade, switch means for said motor mounted on said base, and switch controlling means mounted on said frame and orientated so as to selectively engage and operate said base mounted switch means in response to a pivotal movement of said frame, said switch means, through an engagement of the switch control means thereagainst, deenergizing the blade motor upon a movement of the frame to a lowered position wherein a completion of the desired cut is effected, said switch means switching on said motor upon an elevation of said frame and a corresponding movement of the switch control means relative to the switch means, the frame mounted switch control means comprising an eccentrically mounted cam adjustable so as to vary the operational engagement with the switch means and hence the points at which the motor is energized and deenergized.